(12) United States Patent
Chen et al.

(10) Patent No.: US 6,265,979 B1
(45) Date of Patent: Jul. 24, 2001

(54) EARTHQUAKE SENSING DEVICE

(75) Inventors: Chien-An Chen; Tzong-Sheng Lee; Ching-Yi Wu, all of Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 09/672,998

(22) Filed: Sep. 29, 2000

(51) Int. Cl.[7] ........................................ G01W 1/00
(52) U.S. Cl. ........................ 340/601; 340/690; 73/649; 702/15
(58) Field of Search .................... 340/600, 601, 340/690; 73/654, 649; 702/15

(56) References Cited

U.S. PATENT DOCUMENTS

| | | |
|---|---|---|
| 4,358,757 * | 11/1982 | Perini .......................... 340/601 |
| 5,248,959 * | 9/1993 | Chern .......................... 340/601 |
| 5,408,457 * | 4/1995 | Fujino et al. ................. 367/178 |
| 5,539,387 * | 7/1996 | Gitlis et al. .................. 340/601 |
| 5,742,235 * | 4/1998 | Miche ........................... 340/601 |
| 5,929,767 * | 7/1999 | Wallick ......................... 340/601 |

* cited by examiner

*Primary Examiner*—Daniel J. Wu
(74) *Attorney, Agent, or Firm*—Bacon & Thomas, PLLC

(57) ABSTRACT

A novel earthquake sensing device is disclosed. The earthquake sensing device comprises a vertical vibrating wave sensing module, a horizontal wave sensing module and a determination module to determine the existence of an earthquake, based on, in combination, the vertical waves and the horizontal waves of an earthquake. In determining the existence of an earthquake, both the vertical waves and the horizontal waves of the earthquake are taken for consideration. Errors in the determination of earthquakes may thus be avoided.

3 Claims, 1 Drawing Sheet

EARTHQUAKE SENSING DEVICE

FIELD OF INVENTION

The present invention relates to an earthquake sensing device, especially to an earthquake sensing device applicable to all kinds of safeguarding equipments.

BACKGROUND OF INVENTION

The earthquake sensing device has become a popular appliance in the modern society. Especially when all kinds of safeguarding equipments have been invented to ensure the safety of home, industry, office and other public buildings, the earthquake sensing device has become a necessary component for a variety of equipments, instruments and tools.

An earthquake sensing device is designed to sense strong earthquakes and to generate warning signals so that the relative equipments, instruments and tools may take necessary protective actions accordingly.

Take computerized gas meter as an example. The measurement of gas flow rate in a computerized gas meter is conducted by a gas flow signal converting device. The flow rate signals are then processed by a microcomputer in order to calculate and to monitor the gas flow rate. In the gas meter, an earthquake sensing device is provided. The earthquake sensing device generates a warning signal to the microcomputer when a strong earthquake is sensed. The microcomputer generates a control signal to a shutoff mechanism to stop the gas supply, when a warning signal is generated by the earthquake sensing device. With this facility, fire accidents which always take place after a strong earthquake may be avoided.

In addition, in the fine equipments and instruments used in the industry or in the laboratories, errors in manufacture, control or measurement will appear due to the influence of earthquakes. An earthquake sensing device is useful to indicate possible influences of earthquakes so that proper calibration may not be omitted.

Due to the importance of the earthquake sensing device, a variety of high precision, compact and low-cost earthquake sensing devices are being developed.

U.S. Pat. No. 5,408,457 (assigned to Osaka Gas Co., Ltd. and Kansai Gas Meter Co., Ltd.) disclosed an earthquake sensing device for use inside a gas meter. The earthquake sensing device is capable to sense strong earthquakes and comprises a steel ball hung inside a space surrounded by a continuous wall. When an earthquake takes place, the movement of the steel ball will cause a series of ON and OFF signals generated by an inductive circuit located above the steel ball. This ON/OFF signals may be used to determine the existence of an earthquake. The advantage of this design is that such earthquake sensor is simple and consumes very little electric power. Its disadvantage, on the other hand, is that it is not capable to measure the magnitude of an earthquake correctly. As a result, it is necessary to provide an additional logic circuit to determine whether a warning signal should be generated.

Japan Patent Publication No. 07-020248 disclosed an earthquake magnitude determination logic applicable to said U.S. Pat. No. 5,408,457. The determination logic of this patent includes a logic trueth table wherein values of features of an earthquake such as total period of earthquake, number of cycles of shakes and time of shaking cycles are taking as factors. The advantage of this patent is that the truth table may be used to design the control circuit. Its disadvantage, however, is that the truth table is not applicable to areas where patterns of earthquake are different.

In addition to the above, in Douglas P. Ardunini's article "Smart Sensor Requirements for Second Generation Seismic Gas Shut-Off Valves" and in John Andrew Miche's U.S. Pat. No. 5,742,235, some features of earthquake were disclosed. According to their analysis, in an earthquake, its vertical waves (p-waves) will have a higher transmission speed than that of the horizontal waves (s-waves). On the other hand, the magnitude and the destroying power of the vertical wave are far smaller than that of the horizontal waves. As a result, in said U.S. Pat. No. 5,742,235, a micro vibration switch made from a semiconductor manufacture process was invented to sense the vertical waves of an earthquake. The advantage of this invention is that the structure of this earthquake sensor is simple and that its manufacture cost is relatively low. However, according to another analysis of the features of earthquakes, the magnitude of the vertical waves of an earthquake is very tiny (about 0.01 g). Under such a tiny scale, errors in the determination of an earthquake are easily caused, if only the vertical waves are sensed and are used as the only basis of the determination.

It is thus a need in the industry to provide a high-precision, compact and low-cost earthquake sensor.

OBJECTIVES OF THE INVENTION

The objective of this invention is to provide a novel earthquake sensing device.

Another objective of this invention is to provide an earthquake sensing device with higher precision in determination of the existence of an earthquake.

Another objective of this invention is to provide a compact and low-cost earthquake sensing device that is easy to prepare.

BRIEF DESCRIPTION OF THE INVENTION

According to the present invention, a novel earthquake sensing device is disclosed. The earthquake sensing device comprises a vertical wave sensing module, a horizontal wave sensing module and a determination logic to determine the existence of an earthquake. As both the vertical waves and the horizontal waves are taken for consideration, errors in the determination of earthquakes may be avoided.

These and other objectives and advantages of this invention may be clearly understood from the detailed description by referring to the following drawings.

DETAILED DESCRIPTION OF THE INVENTION

Figure 1:
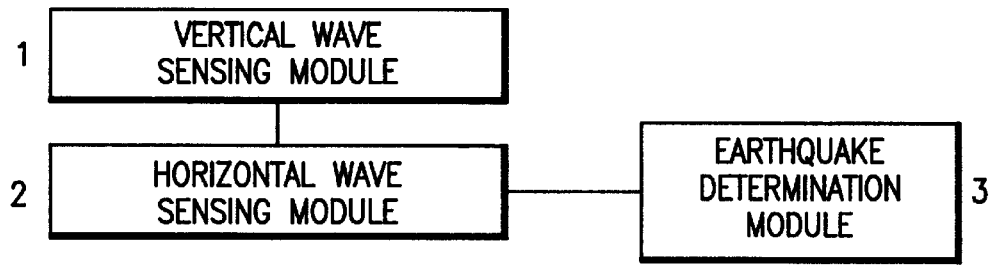
FIG. 1 illustrates the system diagram of the earthquake sensing device of this invention.

FIG. 1 illustrates the system diagram of the earthquake sensing device of this invention. As shown in this figure, the earthquake sensing device of this invention comprises a vertical wave sensing module 1, a horizontal wave sensing module 2 and an earthquake determination module 3.

The vertical wave sensing module of the earthquake sensing device of this invention may be any known vertical wave sensor. The micro vibration switch of the above-said U.S. Pat. No. 5,742,235 may be one of the applicable vertical wave sensor for this invention.

The micro vibration switch of U.S. Pat. No. 5,742,235 is a microelement prepared under the semiconductor preparation process. The micro vibration sensor comprises a constant arm 1a, an elastic suspension arm 1b, a first electric pad 1c positioned above said suspension arm 1b and a second electric pad 1d on said constant arm 1a and beneath said suspension arm, at a certain distance from said suspension arm 1b. When a vertical wave is transmitted to the vibration sensor, the two pads 1c and 1d will contact to build a short circuit and then depart to form a open circuit in turn. The change of the state of the circuit can be sensed and transmitted to micro computer. Such signals may be used as indications of vertical earthquake waves. In FIG. 1, the shape of the vibration sensor 1 is shown. Such vibration sensor 1 is compact, sensitive and low cost and is applicable to the present invention.

The horizontal vibration sensing module 2 of this invention may be a accelerometer. The accelerometer is very sensitive to movements in the horizontal direction. Such a component is compact, sensitive and low cost and is thus applicable to this invention.

It is known from the previous study that, when an earthquake takes place, the vibrating waves in the vertical direction will be first sensed and that the magnitude of the shaking waves in the vertical direction is far less than that of the vibrating waves in the horizontal direction. In the earthquake sensing device of this invention, the signals generated by the vertical wave sensing module 1 is used to trigger the horizontal wave sensing module 2. In other words, only after the vibrating waves in the vertical direction of an earth quake is sensed is the sensing function of the horizontal wave sensing module turned on. Such design is useful to avoid unnecessary waste of electric power of the system.

Figure 2:
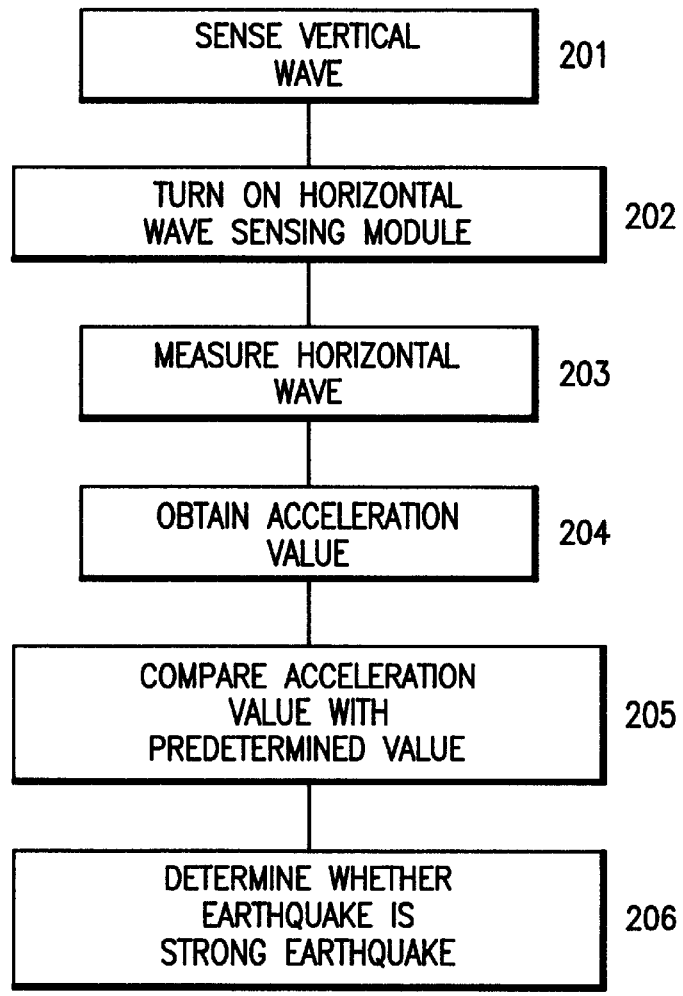
FIG. 2 illustrates the flow chart of the earthquake determination module of the earthquake sensing device of this invention.

When vibrating waves in the vertical direction is sensed by the vertical wave sensing module 1, the earthquake determination module 3 will also be turned on to determine whether an earthquake takes place. The determination module 3 comprises a amplifier circuit, a multiplier circuit, a comparison circuit and a determination circuit (all not shown). FIG. 2 illustrates the flow chart of the earthquake determination module of the earthquake sensing device of the present invention.

As shown in this figure, when an earthquake takes place, the vibrating wave in the vertical direction will first be sensed by the vertical wave sensing module 1 at 201. At 202 the horizontal wave sensing module 2 is turned on to detect the shaking waves in the horizontal direction. At 203 the value of the vibrating waves in the horizontal direction is measured by the horizontal wave sensing module 2 and is amplified by the amplifier circuit and, at 204 is synthesized by the multiplier circuit to obtain the acceleration value of the horizontal waves. The acceleration value is then compared with a predetermined value by the comparison circuit at 205 and the determination circuit determines the existence of a strong earthquake at 206, if the magnitude of the horizontal waves is greater than the predetermined value.

In an embodiment of this invention, the magnitude of the vertical waves is also taken for consideration in determining the existence of an earthquake. However, if such design is desirable, the above-said micro vibration switch may not provide sufficient information in measuring the magnitude of the vertical waves. Additional circuits will needed.

EFFECTS OF THE INVENTION

As the earthquake sensing device of this invention senses the earthquake, taking consideration of the horizontal waves, errors in detection may thus be avoided.

In the earthquake sensing device of this invention, the vertical wave sensing module functions as a micro vibrating switch of the horizontal wave sensing module. Unnecessary consumption of electric power is thus be avoided.

The earthquake sensing device of this invention may be manufactured under the semiconductor preparation process. It is thus possible to prepare highly compact earthquake sensing devices and the manufacture cost may be dramatically reduced.

As the present invention has been shown and described with reference to preferred embodiments thereof, those skilled in the art will recognize that the above and other changes may be made therein without departing from the spirit and scope of the invention.

What is claimed is:

1. An earthquake sensing device comprising:

a vertical wave sensing module to sense the vibrating waves of an earthquake in the vertical direction and to generate a vertical wave sensing signal;

a horizontal wave sensing module to sense the vibrating waves of an earthquake in the horizontal direction and the magnitude of said horizontal vibrating waves and to generate a horizontal wave sensing signal; and a determination module to compare said magnitude of said horizontal vibrating waves with a predetermined value and to determine the existence of an earthquake if said horizontal vibrating waves is greater than said predetermined value;

wherein said horizontal wave sensing module is actuated by said vertical wave sensing signal.

2. The earthquake sensing device according to claim 1, wherein said horizontal wave sensing module comprises a accelerometer.

3. The earthquake sensing device according to claim 1 or 2 wherein said vertical wave sensing module further senses the magnitude of said vertical vibrating waves and outputs signals representing said magnitude of said vertical vibrating waves and said determination module determines the existence of an earthquake by taking said magnitude of said vertical vibrating waves for consideration.

* * * * *